United States Patent
Wu

(10) Patent No.: US 12,501,441 B2
(45) Date of Patent: Dec. 16, 2025

(54) DAI COUNTING METHOD, DAI COUNTING CONTROL METHOD, TERMINAL, AND NETWORK DEVICE

(71) Applicant: VIVO MOBILE COMMUNICATION CO., LTD., Dongguan (CN)

(72) Inventor: Kai Wu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 461 days.

(21) Appl. No.: 17/975,685

(22) Filed: Oct. 28, 2022

(65) Prior Publication Data

US 2023/0046085 A1 Feb. 16, 2023

Related U.S. Application Data

(63) Continuation of application No. PCT/CN2021/089265, filed on Apr. 23, 2021.

(30) Foreign Application Priority Data

Apr. 30, 2020 (CN) .......................... 202010360885.1

(51) Int. Cl.
*H04W 72/04* (2023.01)
*H04W 72/23* (2023.01)

(52) U.S. Cl.
CPC .................. *H04W 72/23* (2023.01)

(58) Field of Classification Search
CPC ........ H04W 72/23; H04L 1/1822; H04L 1/08; H04L 1/1861; H04L 1/1864; H04L 5/0044; H04L 5/0055; H04L 5/0091; H04L 5/001; H04L 5/0012; H04L 5/0023; H04L 5/0048; H04L 1/1812; H04L 5/0094; H04L 1/1854; H04L 1/1858; H04L 5/0053

See application file for complete search history.

(56) References Cited

U.S. PATENT DOCUMENTS

| 12,069,640 | B2 * | 8/2024 | Shao ................. H04W 72/1263 |
| 12,219,572 | B2 * | 2/2025 | Hu ......................... H04W 72/23 |
| 2019/0182807 | A1 | 6/2019 | Panteleev et al. |
| 2019/0230685 | A1 * | 7/2019 | Park ..................... H04L 1/1854 |
| 2020/0186301 | A1 * | 6/2020 | Nunome ............... H04W 72/23 |
| 2020/0213044 | A1 * | 7/2020 | Peng ..................... H04L 1/1864 |
| 2020/0244403 | A1 * | 7/2020 | Talarico ................ H04L 5/0044 |
| 2020/0280969 | A1 * | 9/2020 | Liu ........................ H04L 5/0091 |

(Continued)

FOREIGN PATENT DOCUMENTS

| CN | 110943805 A | 3/2020 | |
| KR | 102438685 B1 * | 8/2022 | ........ H04W 72/1215 |

(Continued)

OTHER PUBLICATIONS

Extended European Search Report related to Application No. 21797687.7; reported on Oct. 2, 2023.

(Continued)

*Primary Examiner* — Wutchung Chu
(74) *Attorney, Agent, or Firm* — von Briesen & Roper, s.c.

(57) ABSTRACT

This application provides a DAI counting method, a DAI counting control method, a terminal, and a network device. The method includes: in a case that physical downlink control channel PDCCH repetition is configured, incrementing a DAI count at a reference PDCCH monitoring occasion.

19 Claims, 4 Drawing Sheets

In a case that physical downlink control channel PDCCH repetition is configured for a terminal, transmit target information to the terminal — 301

(56) References Cited

U.S. PATENT DOCUMENTS

| | | | |
|---|---|---|---|
| 2020/0295878 A1* | 9/2020 | Choi | H04W 72/1273 |
| 2020/0374091 A1* | 11/2020 | Shao | H04L 5/1469 |
| 2020/0382174 A1* | 12/2020 | Shao | H04B 7/0456 |
| 2021/0159952 A1 | 5/2021 | Nunome et al. | |
| 2021/0227560 A1* | 7/2021 | Shao | H04W 72/535 |
| 2021/0314094 A1 | 10/2021 | Gao | |
| 2021/0376963 A1* | 12/2021 | Liang | H04L 1/1896 |
| 2022/0104231 A1* | 3/2022 | Gou | H04W 72/1273 |
| 2022/0201724 A1* | 6/2022 | Zhang | H04L 5/0055 |
| 2022/0271873 A1* | 8/2022 | Gao | H04L 1/1854 |
| 2022/0376844 A1* | 11/2022 | Muruganathan | H04W 72/23 |
| 2023/0026094 A1* | 1/2023 | Ma | H04W 72/23 |
| 2023/0038293 A1* | 2/2023 | Liu | H04L 5/0055 |
| 2023/0046085 A1* | 2/2023 | Wu | H04L 1/1861 |
| 2023/0156699 A1* | 5/2023 | Gao | H04W 72/1273 |
| | | | 370/329 |

FOREIGN PATENT DOCUMENTS

| | | | |
|---|---|---|---|
| WO | 2020012736 A1 | 1/2020 | |
| WO | WO-2020042528 A1 * | 3/2020 | H04L 1/1812 |

OTHER PUBLICATIONS

Japanese first Office Action related to Application No. 2022-566284; reported on Oct. 24, 2023.

Fujitsu, "Considerations on UCI feedback for carrier aggregation", Agenda Item: 6.1.3.4, 3GPP TSG RAN WG1 Meeting #90, R1-1712748, Aug. 21-25, 2017, Prague, Czech Republic.

CAICT. "Potential enhancements to PDCCH for URLLC", Agenda Item: 7.2.6.1.1, 3GPP TSG RAN WG1 Meeting 1901, R1-1901129, Jan. 21-25, 2019, Taipei.

International Search Report & Written Opinion related to Application No. PCT/CN2021/089265 reported on Jul. 21, 2021.

R1-2100286—Source: ZTE, "Enhancements on Multi-TRP for PDCCH, PUCCH and PUSCH", Agenda Item: 8.1.2.1, Document for: Discussion and Decision, 3GPP TSG RAN WG1 Meeting#104-e, Jan. 25-Feb. 5, 2021.

R1-2101654—Source: Ericsson, "On PDCCH, PUCCH and PUSCH enhancements", Agenda Item: 8.1.2.1, Document for: Discussion and Decision, 3GPP TSG-RAN WG1 Meeting#104-e, Jan. 26-Feb. 12, 2021.

* cited by examiner

In a case that physical downlink control channel PDCCH repetition is configured, increment a DAI count at a reference PDCCH monitoring occasion ⎯ 201

In a case that physical downlink control channel PDCCH repetition is configured for a terminal, transmit target information to the terminal ⎯ 301

DAI COUNTING METHOD, DAI COUNTING CONTROL METHOD, TERMINAL, AND NETWORK DEVICE

CROSS-REFERENCE TO RELATED APPLICATIONS

This application is a continuation application of PCT International Application No. PCT/CN2021/089265 filed on Apr. 23, 2021, which claims priority to Chinese Patent Application No. 202010360885.1 filed in China on Apr. 30, 2020, which is incorporated herein by reference in its entirety.

TECHNICAL FIELD

This application relates to the field of communications technologies, and in particular, to a DAI counting method, a DAI counting control method, a terminal, and a network device.

BACKGROUND

As communications technologies develop, physical downlink control channel (PDCCH) repetition is introduced to new radio (NR) systems, by which multiple PDCCHs schedule multiple transmissions of the same physical downlink shared channel (PDSCH), However, as the multiple PDCCHs may use the same downlink assignment index (DAI) value, a new DAI counting method is urgently needed to adapt to the scenario of PDCCH repetition, SUMMARY According to a first aspect, an embodiment of this application provides a DAI counting method, applied to a terminal and including:
  in a case that physical downlink control channel PDCCH repetition is configured, incrementing a DAI count at a reference PDCCH monitoring occasion.

According to a second aspect, an embodiment of this application further provides a DAI counting control method, applied to a network device and including:
  in a case that physical downlink control channel PDCCH repetition is configured for a terminal, transmitting target information to the terminal, where the target information is used for the terminal to determine a reference PDCCH monitoring occasion so as to increment a DAI count at the reference PDCCH monitoring occasion.

According to a third aspect, an embodiment of this application further provides a terminal, including:
  a processing module, configured to, in a case that physical downlink control channel PDCCH repetition is configured, increment a downlink assignment index DAI count at a reference PDCCH monitoring occasion.

According to a fourth aspect, an embodiment of this application further provides a network device, including:
  a transmitting module, configured to, in a case that physical downlink control channel PDCCH repetition is configured for a terminal, transmit target information to the terminal, where the target information is used for the terminal to determine a reference PDCCH monitoring occasion so as to increment a downlink assignment index DAI count at the reference PDCCH monitoring occasion.

According to a fifth aspect, an embodiment of this application further provides a terminal, including a memory, a processor, and a program or instructions stored in the memory and capable of running on the processor, where when the program or instructions are executed by the processor, the steps of the foregoing downlink assignment index DAI counting method are implemented.

According to a sixth aspect, an embodiment of this application further provides a network device, including a memory, a processor, and a program or instructions stored in the memory and capable of running on the processor, where when the program or instructions are executed by the processor, the steps of the foregoing downlink assignment index DAI counting control method are implemented.

According to a seventh aspect, an embodiment of this application provides a readable storage medium, where the readable storage medium stores a program or instructions, and when the program or instructions are executed by a processor, the steps of the foregoing downlink assignment index DAI counting method are implemented, or when the program or instructions are executed by a processor, the steps of the foregoing DAI counting control method are implemented.

According to an eighth aspect, an embodiment of this application provides a chip which includes a processor and a communications interface, where the communications interface is coupled to the processor, and the processor is configured to run a program or instructions so as to implement the method according to the first aspect or the second aspect.

The embodiments of this application define that the DAI count is incremented at the reference PDCCH monitoring occasion. In this way, in the scenario of PDCCH repetition, feedback of multiple copies of HARQ-ACK bits for multiple PDCCHs that schedule the same PDSCH is unnecessary and no PDCCH is considered to miss being detected under the detection of identical DATs. As such, the embodiments of this application resolve the issue of DAI counting in the scenario of PDCCH repetition.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application, Apparently, the described embodiments are some but not all of the embodiments of this application. All other embodiments obtained by a person of ordinary skill in the art based on the embodiments of this application without creative efforts shall fall within the protection scope of this application.

The term "include/comprise" and any other variants in the specification and claims of this application are intended to cover a non-exclusive inclusion. For example, a process, method, system, product, or device that includes a list of steps or units is not necessarily limited to those expressly listed steps or units, but may include other steps or units not expressly listed or inherent to such process, method, product, or device. In addition, in the specification and claims, the use of "and/or" represents presence of at least one of the connected objects, for example, "A and/or B" indicates presence of the following three cases: only A, only B, or both A and B.

In the embodiments of this application, terms such as "illustrative" and "for example" are used to present an example, an instance, or an illustration. Any embodiment or design solution described by "illustrative" and "for example" in the embodiments of this application shall not be interpreted to be more preferential or advantageous than other embodiments or design solutions. To be precise, the terms such as "illustrative" and "for example" are intended to present a related concept in a specific manner.

The following describes the embodiments of this application with reference to the accompanying drawings. The DAI counting method, DAI counting control method, terminal, and network device provided in the embodiments of this application may be applied in a wireless communications system. The wireless communications system may be a 5G system, or an evolved long term evolution (eLTE) system, or a later evolved communications system.

Figures 1, 2, 3:
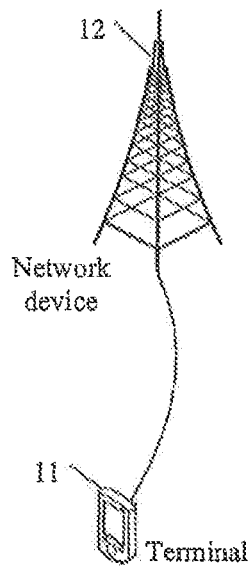
FIG. 1 is a structural diagram of a network system to which an embodiment of this application may be applied.
FIG. 2 is a flowchart of a DAI counting method according to an embodiment of this application.
FIG. 3 is a flowchart of a DAI counting control method according to an embodiment of this application.

Referring to FIG. 1, FIG. 1 is a structural diagram of a network system to which an embodiment of this application may be applied. As shown in FIG. 1, the network system includes a terminal 11 and a network device 12. The terminal 11 may be a user terminal or other terminal side devices, for example, a terminal side device such as a mobile phone, a tablet personal computer, a laptop computer, a personal digital assistant (PDA), a mobile internet device (MID), or a wearable device. It should be noted that a specific type of the terminal 11 is not limited in this embodiment of this application. The network device 12 may be a 5G base station, or a base station of a later release, or a base station in another communications system, and is referred to as a NodeB, or an evolved NodeB, or a transmission reception point (TRP), or an access point (AP), or other terminologies in the art. The network device is not limited to any specific technical term as long as the same technical effect is achieved. In addition, the network device 12 may be a master node (MN) or a secondary node (SN). It should be noted that the embodiments of this application are described with only the 5G base station as an example, but the network device is not limited to any specific type.

For ease of understanding, the following describes some content involved in the embodiments of this application.

I. Dynamic Codebook DAI Counting Method

Currently, two types of hybrid automatic repeat request acknowledgement (HARQ-ACK) codebooks can be supported, including type-1 and type-2. The type-1 codebook is a semi-static HARQ-ACK codebook, and the type-2 codebook is a dynamic HARQ-ACK codebook. For the semi-static HARQ-ACK codebook, user equipment (UE) determines a HARQ-ACK codebook for all PDSCHs that may be fed back in a slot, according to parameters such as candidate PDSCH reception occasion, PDSCH time domain resource allocation (PDSCH-TimeDomainResourceAllocation), and PDSCH to HARQ-ACK feedback timing (dl-DataToUL-ACK or PDSCH-toHARQ-timing) configured by radio resource control (RRC). That codebook is generally considerably large because it may contain HARQ for actually scheduled PDSCHs and HARQ for unscheduled PDSCHs. For the dynamic HARQ-ACK, codebook, UE determines a HARQ-ACK codebook based on actually scheduled PDSCHs. Because only the actually scheduled PDSCHs are fed back, a size of the HARQ-ACK codebook is normally smaller than that of a semi-static HARQ-ACK codebook. Which type of codebook the UE uses is determined by RRC configuration.

When the dynamic HARQ-ACK codebook is used, to prevent inconsistency between the number of HARQ-ACK bits considered by a transmitter and that considered by a receiver because the UE has failed to correctly detect a scheduling PDCCH, a network device adds a DAI in downlink control information (DCI). The DAI can be further divided into two parts: a counter DAI (C-DAI) and a total DAI (T-DAI) in a carrier aggregation scenario. The counter DAI is used to indicate the number of downlink transmissions scheduled as of the DCI, and the total DAI indicates a total number of downlink transmissions over all carriers as of a monitoring occasion (MO) at which the DCI is located. The UE determines a HARQ-ACK feedback codebook according to the received DAI.

Be it T-DAI or C-DAT, the DAI occupies only two bits in the DCI and therefore, based on the DAI information, the UE can determine the detection failure of only less than 4 PDCCHs. For example, the following cases may be included.

Case 1: After the UE detects a PDCCH having C-DAI=0, if it detects no PDCCH having C-DAI=1 but detects a PDCCH having C-DAI=2, the UE considers that the PDCCH having C-DAI=1 has missed being detected, and generates a HARQ-ACK bit corresponding to the PDCCH having C-DAI=1 when generating the HARQ-ACK feedback codebook.

Case 2: After the UE detects a PDCCH having C-DAI0, if it detects no PDCCHs having C-DAI=1, 2, and 3 but detects a PDCCH having C-DAI=0 again, the HE considers that the PDCCHs having C-DAI=1, 2, and 3 have missed being detected, and generates HARQ-ACK bits corresponding to the PDCCHs having C-DAI=1, 2, and 3 when generating the HARQ-ACK feedback codebook. Moreover, because the DAI has only 2 bits, the C-DAI values are repeated each time 4 PDCCHs are transmitted, that is, one DAI cycle is completed. A counter j is used to count cycles of DAI values so as to determine how many cycles of DAI values have been completed and thus to determine the number of bits in the HARQ-ACK codebook. After the UE detects a PDCCH having C-DAI=0, if it detects no PDCCHs having C-DAI=1, 2, and 3 but detects a PDCCH having C-DAI=0 again, the UE considers that one cycle of C-DAI values has been completed, during which the PDCCHs having C-DAI=1, 2, and 3 have been transmitted, in which case the counter j reads j+1.

Case 3: After the UE detects a PDCCH having C-DAI=X, if it detects a PDCCH having C-DAI=Y, where Y≤X, the HE considers that a next cycle of DAT values has begun, and the counter j reads j+1.

II. PDCCH Repetition

Multiple transmissions of PDCCH, or referred to as PDCCH repetition, are introduced to schedule same PDSCH transmission, where the PDSCH transmission may be a PDSCH which is not a repetition or a PDSCH which is a repetition, and multiple PDSCH repetitions may have same or different redundancy versions (RV).

For multiple PDCCHs that schedule the same PDSCH transmission, if DAIs are counted based on an MO sequence of the PDCCHs, each PDCCH will have its corresponding HARQ-ACK feedback bit according to existing HARQ-ACK feedback and DAI counting rules. For example, if 2 PDCCHs are used to schedule one PDSCH transmission, HARQ-ACK feedback needs to be provided for both the PDCCHs, which causes redundant feedback bits and degrades feedback performance. The transmissions of the 2 PDCCHs may be repetitions or not repetitions.

If the same DAI value is used in multiple PDCCHs, according to the existing rules, it is considered that UE has failed to detect some of the PDCCHs, and the DAI cycle counter j will read j+1, However, because the scheduling is done by multiple PDCCHs, the UE in fact does not miss detecting any PDCCH at all, Therefore, with PDCCH repetition introduced to schedule PDSCH transmissions, a new DAI counting method needs to be introduced such that the UE does not need to feed back multiple copies of HARQ-ACK bits for multiple PDCCHs that schedule the same PDSCH transmission, thus avoiding considering that UE has failed to detect some PDCCHs under detection of identical DAIs. This is explained in detail in the following embodiments.

Referring to FIG. 2, FIG. 2 is a flowchart of a DAI counting method according to an embodiment of this application. The method is applied to a terminal, and as shown in FIG. 2, includes the following step.

Step 201: In a case that physical downlink control channel PDCCH repetition is configured, increment a DAI count at a reference PDCCH monitoring occasion.

In this embodiment, whether PDCCH repetition is enabled for the terminal may be configured by a network device. PDCCH repetition may be understood as multiple PDCCHs scheduling transmissions of the same PDSCH, or the network configuring the UE to monitor for scheduling of transmissions of the same PDSCH at multiple PDCCH monitoring occasions.

The reference PDCCH monitoring occasion may be any one of PDCCH monitoring occasions corresponding to the configured multiple PDCCHs in repetition. The reference PDCCH monitoring occasion may be specifically indicated by the network device or prescribed by a protocol. With the reference PDCCH monitoring occasion defined, DAI counting can be implemented according to the monitoring occasion at which the detected PDCCH is located. Specifically, it is possible to first determine whether the monitoring occasion at which the currently detected PDCCH is located is the reference PDCCH monitoring occasion; and if the monitoring occasion is the reference PDCCH monitoring occasion, increment the DAI count at the monitoring occasion according to the DAI value carried by the detected PDCCH; and if the monitoring occasion is not the reference PDCCH monitoring occasion, skip incrementing the DAI count at the monitoring occasion, or in short, skip incrementing the DAI count. If the DAI count is to be incremented, the detected DAI is compared with a temporary DAI. The skipping incrementing the DAI count means that the detected DAI is not compared with the temporary DAT, where the temporary DAI is a DAI value currently stored by the UE.

This embodiment of this application defines that the DAI count is incremented at the reference PDCCH monitoring occasion. In this way, in the scenario of PDCCH repetition, feedback of multiple copies of HARQ-ACK bits for multiple PDCCHs that schedule the same PDSCH is unnecessary and no PDCCH is considered to miss being detected under the detection of identical DAIs. As such, this embodiment of this application resolves the issue of DAI counting in the scenario of PDCCH repetition.

Optionally, in an embodiment, the reference PDCCH monitoring occasion includes any one of the following:
 a PDCCH monitoring occasion indicated by the network device; or
 the first PDCCH monitoring occasion or the last PDCCH monitoring occasion in M PDCCH monitoring occasions corresponding to M PDCCHs in repetition, where M is an integer greater than 1.

In an embodiment, the reference PDCCH monitoring occasion may be indicated by the network device or prescribed by a protocol. For example, the network device may indicate specifically a PDCCH monitoring occasion of which ordinal position is the reference PDCCH monitoring occasion. Specifically, the network device may indicate the reference PDCCH monitoring occasion through signaling such as RRC and DCI. The network device may indicate the reference PDCCH monitoring occasion when configuring PDCCH repetition for the terminal, where the indicated reference monitoring occasion may be any one of multiple PDCCH monitoring occasions configured for repetition.

In another embodiment, one of multiple PDCCH monitoring occasions configured for repetition may be defined as the reference PDCCH monitoring occasion by the protocol, for example, the first PDCCH monitoring occasion or the last PDCCH monitoring occasion in M PDCCH monitoring occasions corresponding to M PDCCHs in repetition.

Further, a location of the reference PDCCH monitoring occasion is determined based on any one of the following:
 the first PDCCH monitoring occasion in M PDCCH monitoring occasions corresponding to M PDCCHs in repetition, where M is an integer greater than 1; or
 first indication information carried by a PDCCH, where the first indication information is used to indicate an ordinal position of the PDCCH in M PDCCHs.

In an embodiment, the network device may indicate the first PDCCH monitoring occasion in the M PDCCH monitoring occasions corresponding to the M PDCCHs, and once determining the first PDCCH monitoring occasion, the terminal is able to determine the location corresponding to the reference PDCCH monitoring occasion. Specifically, the network device may indicate in a PDCCH transmitted at the first PDCCH monitoring occasion that the PDCCH is a PDCCH transmitted at the first PDCCH monitoring occasion. For example, the network device may indicate in the PDCCH transmitted at the first PDCCH monitoring occasion that the PDCCH is the first PDCCH. The first PDCCH may be understood as the PDCCH transmitted at the first PDCCH monitoring occasion in the M PDCCH monitoring occasions, or may be understood as a PDCCH in the M PDCCHs corresponding to the M PDCCH monitoring occasions which is transmitted in the first transmission. If the last PDCCH monitoring occasion is the reference monitoring occasion, the terminal may determine PDCCH monitoring occasions of other ordinal positions based on the first PDCCH monitoring occasion as indicated by this information. For example, the terminal determines the (M−1)-th PDCCH monitoring occasion after the first PDCCH monitoring occasion as the last PDCCH monitoring occasion, which is used as the reference PDCCH monitoring occasion.

Nonetheless, the location of the first PDCCH monitoring occasion may alternatively be indicated by other signaling.

In another embodiment, the first indication information for indicating the ordinal position of the PDCCH in the M PDCCHs may be directly carried in the PDCCH. In this embodiment, the ordinal position may be understood as a position of a PDCCH transmission in the M PDCCH transmissions configured, for example, the N-th PDCCH transmission or the N-th PDCCH, The N-th PDCCH transmission may be understood as a PDCCH transmitted at the N-th PDCCH monitoring occasion in the M PDCCH monitoring occasions corresponding to the M PDCCHs in repetition, where N is a positive integer less than or equal to M. For example, the reference PDCCH monitoring occasion is the third PDCCH monitoring occasion. In this case, only when the first indication information in a PDCCH detected indicates the third PDCCH transmission or the third PDCCH is the DAI count incremented at a monitoring occasion corresponding to that PDCCH, while at other PDCCH monitoring occasions, the DAI count is not incremented. Alternatively, if the terminal detects any one of the M PDCCH monitoring occasions carrying the first indication information, the terminal can determine the reference PDCCH monitoring occasion based on that indication information. For example, the terminal detects that the first indication information in the PDCCH indicates that the PDCCH is the (N−1)-th PDCCH transmission or the (N−1)-th PDCCH monitoring occasion, the terminal can determine that the next PDCCH monitoring occasion is the N-th PDCCH transmission, or the N-th PDCCH monitoring occasion, and determine it as the reference PDCCH monitoring occasion. Similarly, if the first PDCCH monitoring occasion, or the first PDCCH transmission, is the reference PDCCH monitoring occasion, the terminal can also find the first PDCCH monitoring occasion through backward deduction, and determine it as the reference PDCCH monitoring occasion.

In another embodiment, indication information may be introduced into the PDCCH to indicate whether a DAI field in the PDCCH of the terminal is to be counted. If the information indicates counting DAI, the UE increments the DAI count; otherwise, the terminal does not increment the DAI count, that is, the UE ignores that DAI value at the current PDCCH monitoring occasion. Preferably, the method may not be limited to that the network has configured PDCCH repetition, or that the network has configured that the same PDSCH scheduling information is monitored at multiple PDCCH monitoring occasions.

It should be understood that DAI values in the multiple PDCCHs in repetition may be the same or different. In this embodiment, the incrementing a DAI count at a reference PDCCH monitoring occasion includes:
in a case that M PDCCHs in repetition have the same DAI value, incrementing the DAI count at the reference PDCCH monitoring occasion for a DAI value in a detected PDCCH.

That is, in this embodiment, in the M PDCCHs in repetition, the DAI count is incremented only once for the multiple PDCCHs having the same DAI value.

In this embodiment, incrementing the DAI count at the reference PDCCH monitoring occasion, the DAI value counted may be a DAI value corresponding to a DAI carried by any one of the M PDCCHs, for example, may be a DAI value detected at the reference monitoring occasion or a DAI value detected before the reference monitoring occasion, which is not further limited herein.

Further, in an embodiment, the method further includes:
determining whether to increment a count of a DAI cycle counter.

In this embodiment, DAI is usually represented by a small number of bits, for example, only 2 bits. Therefore, the C-DAI value is repeated each time 4 PDCCHs are transmitted, that is, one DAI cycle is completed. A counter j is used to count cycles of DAI values so as to determine how many cycles of DAI values have been completed and thus to determine the number of bits in the HARQ-ACK codebook. The 4 PDCCHs mean that 4 PDCCHs are to be transmitted with each PDCCH having multiple repetitions or each PDCCH having multiple PDCCH monitoring occasions. It should be understood that when the number of value cycles is counted, an operation of incrementing by 1 may be performed each time.

It should be understood that the determining whether to increment a count of a DAI cycle counter includes:
in a case that a preset condition is satisfied, skipping incrementing the count of the DAI cycle counter, where the preset condition includes that:
N PDCCHs have been detected at PDCCH monitoring occasions for PDCCH repetition, the N PDCCHs carrying the same DAI value.

Because the count of DAI cycles is not incremented in the case of multiple PDCCHs with the same DAI value, mistaking that some PDCCHs have missed being detected is avoided.

Optionally, in an embodiment, the preset condition further includes that:
the N PDCCH-Hs have the same physical downlink shared channel PDSCH scheduling information.

It should be noted that the PDSCH scheduling information may include at least one of the following: a new data indicator (NDT) a HARQ process number, a PDSCH resource, a transport block size, a redundancy version, a HARQ codebook priority, and a modulation and coding scheme (MCS). The DAI may include at least one of a counter DAI and a total DAL.

The PDSCH resource may include at least one of the following: a time-frequency resource, a carrier, a mapping scheme, a demodulation reference signal (DMRS), a resource allocation mode, and the like. The mapping scheme may include whether frequency hopping is implemented.

Further, in an embodiment, after the incrementing a DAI count at a reference PDCCH monitoring occasion, the method further includes:
determining a hybrid automatic repeat request acknowledgement HARQ-ACK codebook based on DAI values in L PDCCHs detected and a counted downlink control information DCI repetition number in the L PDCCHs, where L is a positive integer greater than 1.

In this embodiment, the UE may determine the hybrid automatic repeat request acknowledgement HARQ-ACK codebook based on the DAI values in the L PDCCHs detected and the counted downlink control information DCI repetition number in the L PDCCHs, when the UE detects PDCCHs having the same DAI value or different DAI values and the L PDCCHs detected have the same PDSCH scheduling information.

The manner of determining the HARQ-ACK codebook may be: providing HARQ-ACK feedback information once for PDCCHs having the same PDSCH scheduling information.

In this embodiment, when X1 is not equal to Y1, the terminal may understand that $\mod(X1-N1, X)$ pieces of DCI are lost, where X1 and Y1 satisfy:

X1=Mod(x, X); and
y1=Mod(y, y); where
X=2^ Q, where Q is a DAI bit length (DAI bit length); or X=4;
Y is the number of PDCCH repetitions or the maximum number of PDCCH repetitions; or Y=2^P, where P is a DCI repetition number field bit length (DCI repetition number field bit length) indicating that an ordinal position of a current PDCCH in multiple transmissions or an ordinal position thereof in multiple PDCCH monitoring occasions;
x is a difference between a DAI value detected by the terminal and a DAT value stored by the terminal, where after each detection of a PDCCH, a DAI value carried in the PDCCH is compared with a currently stored DAI value to obtain the difference x, and then the DAI value carried in the detected PDCCH may be stored to update the currently stored DAI value; and
y is a difference between a DCI repetition number counted for PDCCHs having the same PDSCH scheduling information as detected by the terminal and a counted DCI repetition number of PDCCHs as stored by the terminal.

To better understand this application, the following describes an implementation process of this application in detail based on specific examples.

Embodiment 1: The network has configured UE to schedule PDSCH using PDCCH repetition. The manner of scheduling PDSCH, using PDCCH repetition may also be expressed as transmitting multiple PDCCHs that schedule the same PDSCH transmission, where the PDSCH transmission may be a PDSCH which is not a repetition, or a PDSCH which is a repetition, and multiple PDSCH repetitions may have the same or different RVs.

For example, a PDCCH has a maximum of N transmissions as configured by the network, and the UE monitors for that PDCCH at N monitoring occasions. If the UE detects PDCCH at any one of these PDCCH monitoring occasions, the UE uses a DAI value in the detected PDCCH as a DAI value of a reference PDCCH monitoring occasion, where the reference PDCCH monitoring occasion is one of the N monitoring occasions, and may be one of the monitoring occasions as indicated by the network or the first monitoring occasion or the last monitoring occasion in the N: monitoring occasions.

In an embodiment, optionally, a PDCCH has at most 2 transmissions, and a DAI value in DCI detected by the UE at the 2 PDCCH monitoring occasions is used as a DAI value in a PDCCH detected at the last PDCCH monitoring occasion. In other words, when the UE detects a PDCCH at the first monitoring occasion, it does not increment the DAI count at the current monitoring occasion but increments the DAI count at the last PDCCH monitoring occasion.

In another embodiment, optionally, a PDCCH has at most 2 transmissions, and a DAI value in DCI detected by the UE at the 2 PDCCH MOs is used as a DAI value in a PDCCH detected at the first monitoring occasion. In other words, when the UE detects a PDCCH at the second monitoring occasion, it does not increment the DAI count at the current monitoring occasion but uses that value to increment the DAI count at the first PDCCH monitoring occasion.

Further, because multiple PDCCHs are used to schedule the same PDSCH, when the UE detects that multiple PDCCHs have the same DAI value, the UE does not increment the count of the DAI cycle counter.

Further, a possible implementation may be that, when the UE detects that multiple pieces of DCI have the same PDSCH scheduling information, the UE does not increment the count of the DAI cycle counter.

The UE, determines, according to the reference monitoring occasion and the DAI value, a location of a HARQ-ACK feedback bit corresponding to the scheduled PDSCH in the HARQ-ACK codebook. If the reference monitoring occasion is the first PDCCH monitoring occasion, the UE determines, according to the first reference monitoring occasion, a location of a HARQ-ACK feedback bit corresponding to the scheduled PDSCH in the HARQ-ACK codebook; and if the reference monitoring occasion is the last PDCCH monitoring occasion, the UE determines, according to the last monitoring occasion, a location of a HARQ-ACK feedback bit corresponding to the scheduled PDSCH in the HARQ-ACK codebook.

Optionally, the DAI includes a counter DAI or a total DAT

Embodiment 2: How the UE determines the sequence of PDCCH monitoring occasions.

This is done according to a start monitoring occasion indicated by a network. For example, the network may indicate that the start PDCCH monitoring occasion for PDCCH repetition is the first monitoring occasion. Then, the N-th PDCCH monitoring occasion is determined from consecutive monitoring occasions configured by the network based on the start PDCCH monitoring occasion. The multiple monitoring occasions may satisfy at least one of the following:

belonging to the same serving cell or different serving cells, where monitoring occasions in different serving cells are sorted by serving cell index;

belonging to the same TRP or different TRPs, where monitoring occasions in different TRPs are sorted by TRP index;

belonging to the same control resource set (CORESET) or different CORESETs, where monitoring occasions in the different CORESETs are sorted by CORESET index or control resource set pool index (CORESET pool index);

belonging to the sane search space set or different search space sets, where monitoring occasions in different search space sets are sorted by search space index; and belonging to the same slot or PDCCH monitoring span or different slots or PDCCH monitoring spans, where monitoring occasions in different slots or PDCCH monitoring spans are sorted by slot or PDCCH monitoring span index.

Optionally, a DCI field may include indication information of the number of transmissions of the PDCCH till the current transmission. Then, according to the current number of transmissions of the PDCCH indicated in the DC, the UE can determine whether the PDCCH monitoring occasion is a reference PDCCH monitoring occasion.

Embodiment 3: The network may schedule the same PDSCH transmission in multiple PDCCHs, which means that the UE can detect the same PDSCH scheduling information in multiple PDCCHs. In the multiple PDCCHs, the indication information including a PDCCH repetition number is P bits, and the DAI is Q bits. For multiple pieces of DCI with the same PDSCH scheduling information, DAIs are not required to be the same. For example, the DAIs may be counted together with DCI of the PDSCHs for scheduling the same or different processes. Each time the UE detects a PDCCH which is one of DCIs scheduling a given PDSCH, the UE stores numerical values of a DAI in the DCI and a DCI repetition number. The numerical values stored by the UE are initially 0.

The UE determines a HARQ-ACK codebook based on the DAI value in the detected PDCCH together with the counted DCI repetition number. HARQ-ACK feedback information is provided once for PDCCHs having the same PDSCH scheduling information. That is, although DAI values in the PDCCHs in repetition are different, the HARQ-ACK feedback corresponding to the DAI values is transmitted only once in the information bits in the HARQ-ACK codebook.

Given that a difference between the DAI value detected by the UE and the DAI value stored by the UE is x and that a difference between the DCI repetition number counted for PDCCHs having the same PDSCH scheduling information as detected by the UE and the counted DCI repetition number of PDCCHs as stored by the UE is y, if X1=Mod(x, X) is not equal to Y1=Mod(y, Y), the UE considers that mod(X1−Y1, X) pieces of DCI are lost, and generates a HARQ-ACK codebook, where X=2 ^Q and Y=2 ^P, Therefore, the UE considers that PDSCHs of X other processes are lost. Thus, feedback information bits corresponding to this DCI in the HARQ-ACK codebook as provided by the UE are NACK.

For example, P=2, Q=2, and the UE detects one piece of DCI, where DAI=0 and the DCI repetition number is 0. If the UE detects another DCI having the same PDSCH scheduling information, where DAI=2 and the PDCCH repetition number is 1, the UE considers that X1=2 and Y1=1, and therefore considers that the PDSCH of one other process is lost. Thus, feedback information bits corresponding to this DCI in the HARQ-ACK codebook as provided by the UE are NACK.

Optionally, in a case that PDCCH repetition is configured, the undetected PDSCH determined using the foregoing method is a SPS PDSCH or a PDSCH scheduled by a non-repetition PDCCH.

Referring to FIG. 3, FIG. 3 is a flowchart of DAI counting control method according to an embodiment of this application. The method is applied to a network device, and as shown in FIG. 3, includes the following step.

Step 301: In a case that physical downlink control channel PDCCH repetition is configured for a terminal, transmit target information to the terminal, where the target information is used for the terminal to determine a reference PDCCH monitoring occasion so as to increment a DAI count at the reference PDCCH monitoring occasion.

Optionally, the target information includes any one of the following:
first indication information carried by a PDCCH, where the first indication information is used to indicate an ordinal position of the PDCCH in M PDCCHs; or
second indication information used to indicate the first PDCCH monitoring occasion in M PDCCH monitoring occasions corresponding to 4 PDCCHs in repetition, where M is an integer greater than 1.

Optionally, the reference PDCCH monitoring occasion includes any one of the following:
a PDCCH monitoring occasion indicated by the network device; or
the first PDCCH monitoring occasion or the last PDCCH monitoring occasion in M PDCCH monitoring occasions corresponding to M PDCCHs in repetition, where 4 is an integer greater than 1.

It should be noted that this embodiment is a network device side implementation corresponding to the embodiment shown in FIG. 2. Its specific implementation may be learned from the related description of the embodiment shown in FIG. 2 and the same beneficial effect is achieved. To avoid repetition, details are not described herein again.

Figure 4:
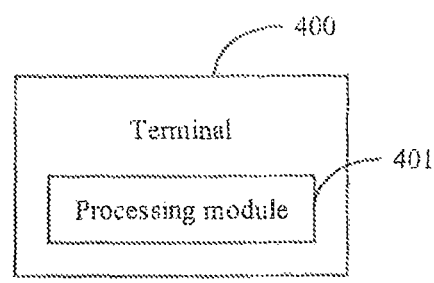
FIG. 4 is a structural diagram of a terminal according to an embodiment of this application.

Referring to FIG. 4, FIG. 4 is a structural diagram of a terminal according to an embodiment of this application. As shown in FIG. 4, the terminal 400 includes:
a processing module 401, configured to, in a case that physical downlink control channel PDCCH repetition is configured, increment a downlink assignment index DAI count at a reference PDCCH monitoring occasion.

Optionally, the reference PDCCH monitoring occasion includes any one of the following:
a PDCCH monitoring occasion indicated by a network device; or
the first PDCCH monitoring occasion or the last PDCCH monitoring occasion in M PDCCH monitoring occasions corresponding to M PDCCHs in repetition, where M is an integer greater than 1.

Optionally, a location of the reference PDCCH monitoring occasion is determined based on any one of the following:
the first PDCCH monitoring occasion in M PDCCH monitoring occasions corresponding to M PDCCHs in repetition, where M is an integer greater than 1; or
first indication information carried by a PDCCH, where the first indication information is used to indicate an ordinal position of the PDCCH in M PDCCHs.

Optionally, the incrementing a DAI count at a reference PDCCH monitoring occasion includes:
in a case that M PDCCHs in repetition have the same DAI value, incrementing the DAI count at the reference PDCCH monitoring occasion for a DAI value in a detected PDCCH.

Optionally, the processing module 401 is further configured to determine whether to increment a count of a DAI cycle counter.

Optionally, the processing module 401 is specifically configured to, in a case that a preset condition is satisfied, skip incrementing the count of the DAI cycle counter; where the preset condition includes that:
N PDCCHs have been detected at PDCCH monitoring occasions for PDCCH repetition, the N PDCCHs carrying the same DAI value.

Optionally, the preset condition further includes that:
the N PDCCHs have the same physical downlink shared channel PDSCH scheduling information.

Optionally, the PDSCH scheduling information includes at least one of the following: a new data indicator, a HARQ process number, a PDSCH resource, a transport block size, a redundancy version, a HARQ codebook priority, and a modulation and coding scheme.

Optionally, after the incrementing a DAI count at a reference PDCCH monitoring occasion, the method further includes:
determining a hybrid automatic repeat request acknowledgement HARQ-ACK codebook based on DAI values in L PDCCHs detected and a counted downlink control information DCI repetition number in the L PDCCHs, where L is a positive integer greater than 1.

Optionally, the DAI includes at least one of a counter DAI and a total DAI.

The terminal provided in this embodiment of this application can implement the processes implemented by the terminal in the method embodiment in FIG. 2. To avoid repetition, details are not described herein again.

Figure 5:
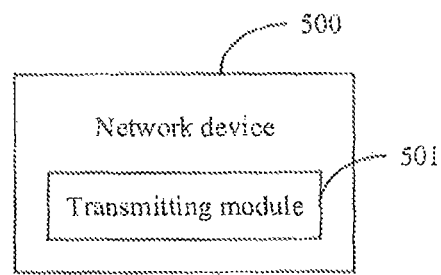
FIG. 5 is a structural diagram of a network device according to an embodiment of this application.

Referring to FIG. 5, FIG. 5 is a structural diagram of a network device according to an embodiment of this application. As shown in FIG. 5, the network device 500 includes:
a transmitting module 501, configured to, in a case that physical downlink control channel PDCCH repetition is configured for a terminal, transmit target information to the terminal, where the target information is used for the terminal to determine a reference PDCCH monitoring occasion so as to increment a downlink assignment index DAI count at the reference PDCCH monitoring occasion.

Optionally, the target information includes any one of the following:

first indication information carried by a PDCCH, where the first indication information is used to indicate an ordinal position of the PDCCH in N PDCCHs; or second indication information used to indicate the first PDCCH monitoring occasion in M PDCCH monitoring occasions corresponding to M PDCCHs in repetition, where M is an integer greater than 1.

Optionally, the reference PDCCH monitoring occasion includes any one of the following:

a PDCCH monitoring occasion indicated by the network device: or the first PDCCH monitoring occasion or the last PDCCH monitoring occasion in M PDCCH monitoring occasions corresponding to M PDCCHs in repetition, where M is an integer greater than 1.

The network device provided in this embodiment of this application can implement the processes implemented by the network device in the method embodiment in FIG. 3. To avoid repetition, details are not described herein again.

Figure 6:
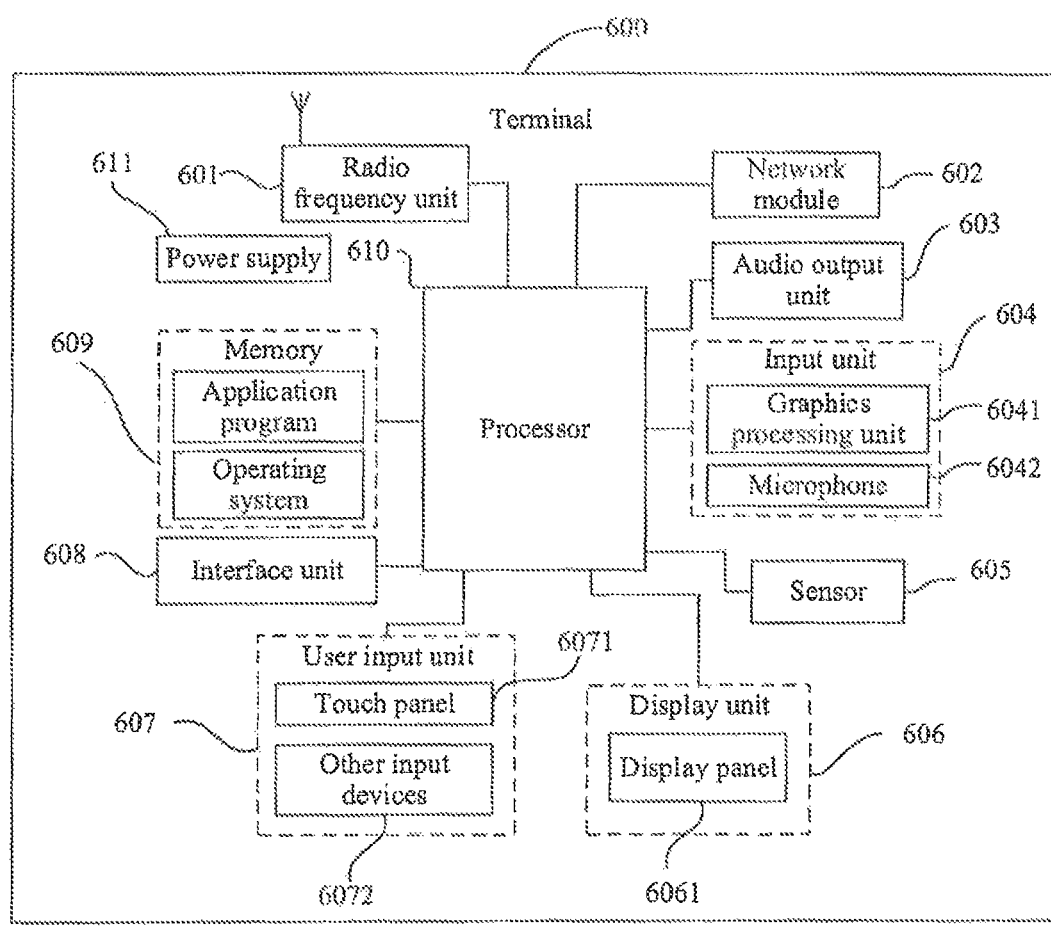
FIG. 6 is a structural diagram of another terminal according to an embodiment of this application.

FIG. 6 is a schematic diagram of a hardware structure of a terminal for implementing the embodiments of this application.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611, A person skilled in the art can understand that the structure of the terminal shown in FIG. 6 does not constitute any limitation on the terminal, and the terminal may include more or fewer components than shown in the diagram, or combine some of the components, or have different arrangements of the components.

The processor 610 is configured to, in a case that physical downlink control channel PDCCH repetition is configured, increment a DAI count at a reference PDCCH monitoring occasion.

It should be understood that, in this embodiment, the processor 610 and the radio frequency unit 601 can implement the processes implemented by the terminal in the method embodiment shown in FIG. 2. To avoid repetition, details are not described herein again.

It should be understood that in this embodiment of this application, the radio frequency unit 601 may be configured to receive and send information, or to receive and send a signal in a call process, and specially, after receiving downlink data from a base station, send the downlink data to the processor 610 for processing; and also send uplink data to the base station, Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The terminal provides a user with wireless broadband Internet access by using the network module 602, for example, helping the user to transmit and receive e-mails, browse web pages, and access streaming media.

The audio output unit 603 may convert audio data into an audio signal, and output the audio signal as sound, where the audio data is received by the radio frequency unit 601 or the network module 602, or stored in the memory 609. In addition, the audio output unit 603 may further provide audio output (for example, a call signal received tone or a message received tone) that is related to a specific function performed by the terminal 600, The audio output unit 603 includes a speaker, a buzzer, a receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. The image frame processed by the graphics processing unit 6041 may be stored in the memory 609 (or another storage medium) or transmitted by using the radio frequency unit 601 or the network module 602. The microphone 6042 can receive sounds and process such sounds into audio data. The processed audio data can be converted in a telephone call mode into a format that can be transmitted as an output by the radio frequency unit 601 to a mobile communication base station.

The terminal 600 may further include at least one sensor 605, for example, an optical sensor, a motion sensor, and other sensors. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include the display panel 6061. Optionally, the display panel 6061 may be configured in a form of a liquid crystal display (LCD), organic light-emitting diodes (OLED), or the like.

The user input unit 607 may be configured to receive input digit or character information, and generate a key signal input related to user setting and function control of the terminal. Specifically, the user input unit 607 includes a touch panel 6071 and other input devices 6072. The touch panel 6071, or referred to as a touchscreen, may capture a touch operation performed by a user on or near the touch panel 6071 (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 610, and receives and executes a command transmitted by the processor 610. In addition, the touch panel 6071 may be implemented in a plurality of forms, for example, as a resistive, capacitive, infrared, or surface acoustic wave touch panel. In addition to the touch panel 6071, the user input unit 607 may further include other input devices 6072. Specifically, the other input devices 6072 may include but are not limited to a physical keyboard, a function button (for example, a volume control button or a power on/off button), a trackball, a mouse, and a joystick. Details are not described herein.

Further, the touch panel 6071 may cover the display panel 6061. After detecting a touch operation on or near the touch panel 6071, the touch panel 6071 transmits the touch operation to the processor 610 for determining a type of the touch event. Then the processor 610 provides corresponding visual output on the display panel 6061 based on the type of the touch event. In FIG. 6, the touch panel 6071 and the display panel 6061 serve as two separate components to implement input and output functions of the terminal. However, in some embodiments, the touch panel 6071 and the display panel 6061 may be integrated to implement the input and output functions of the terminal. This is not specifically limited herein.

The interface unit 608 is an interface between an external apparatus and the terminal 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to receive an input (for example, data information or power) from an external apparatus, and transmit the received input to one or more components in the terminal 600, or may be configured to transmit data between the terminal 600 and an external apparatus.

The memory 609 may be configured to store software programs and various data. The memory 609 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 609 may include a high-speed random access memory, or may further include a non-volatile memory, for example, at least one magnetic disk storage device, flash memory, or other volatile solid-state storage device.

The processor 610 is a control center of the terminal, and is connected to all components of the terminal by using various interfaces and lines. By running or executing software programs and/or modules stored in the memory 609 and invoking data stored in the memory 609, the processor 610 executes various functions of the terminal and processes data, so as to perform overall monitoring on the terminal. The processor 610 may include one or more processing units. Preferably, the processor 610 may integrate an application processor and a modem processor. The application processor mainly processes the operating system, a user interface, an application program, and the like. The modem processor mainly processes wireless communication. It can be understood that the modem processor may alternatively be not integrated in the processor 610.

The terminal 600 may further include the power supply 611 (such as a battery) supplying power to the components. Preferably, the power supply 611 may be logically connected to the processor 610 via a power management system, so that functions such as charge and discharge management and power consumption management are implemented via the power management system.

In addition, the terminal 600 includes some functional modules that are not shown, which are not further described herein.

Optionally, an embodiment of this application further provides a terminal, including a processor 610, a memory 609, and a program or instructions stored in the memory 609 and capable of running on the processor 610, where when the program or instructions are executed by the processor 610, the processes of the foregoing DAI counting method embodiment are implemented, with the same technical effects achieved. To avoid repetition, details are not further described herein.

Figure 7:
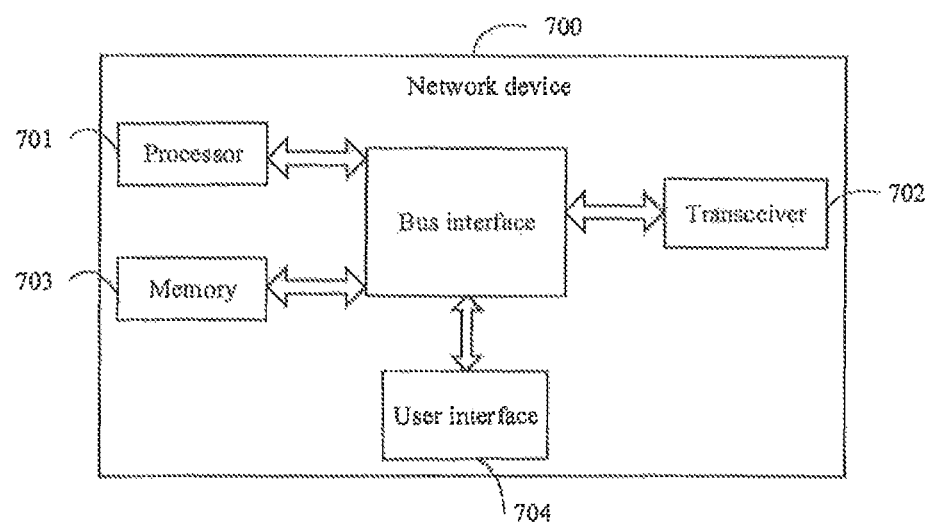
FIG. 7 is a structural diagram of another network device according to an embodiment of this application.

Referring to FIG. 7, FIG. 7 is a structural diagram of another network device according to an embodiment of this application. As shown in FIG. 7, the network device 700 includes a processor 701, a transceiver 702, a memory 703, and a bus interface.

The transceiver 702 is configured to, in a case that physical downlink control channel PDCCH repetition is configured for a terminal, transmit target information to the terminal, where the target information is used for the terminal to determine a reference PDCCH monitoring occasion so as to increment a DAI count at the reference PDCCH monitoring occasion.

It should be understood that, in this embodiment, the processor 701 and the transceiver 702 can implement the processes implemented by the network device in the method embodiment shown in FIG. 3. To avoid repetition, details are not described herein again.

In FIG. 7, a bus architecture may include any quantity of interconnected buses and bridges, and specifically connect together various circuits of one or more processors represented by the processor 701 and a memory represented by the memory 703, The bus architecture may further interconnect various other circuits such as a peripheral device, a voltage regulator, and a power management circuit. These are all well known in the art, and therefore are not further described in this specification. The bus interface provides interfaces. The transceiver 702 may be a plurality of components, including a transmitter and a receiver, and provides units for communicating with a variety of other apparatuses via a transmission medium. For different user equipment, the user interface 704 may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 703 may store data for use by the processor 701 when the processor 701 performs an operation.

Optionally, an embodiment of this application further provides a network device, including a processor 701, a memory 703, and a program or instructions stored in the memory 703 and capable of running on the processor 701, where when the program or instructions are executed by the processor 701, the processes of the foregoing DAI counting control method embodiment are implemented, with the same technical effects achieved. To avoid repetition, details are not further described herein.

An embodiment of this application further provides a readable storage medium, where the readable storage medium stores a program or instructions, and when the program or instructions are executed by a processor, the processes of the DAI counting control method embodiment at a network device side according to the embodiments of this application are implemented, or when the program or instructions are executed by a processor, the processes of the DAI counting method embodiment at a terminal side according to the embodiments of this application are implemented, with the same technical effects achieved. To avoid repetition, details are not described herein again. For example, the readable storage medium is a read-only memory (ROM), a random access memory (RAM), a magnetic disk, or an optical disc.

According to an eighth aspect, an embodiment of this application provides a chip, where the chip includes a processor and a communications interface, the communications interface is coupled to the processor, and the processor is configured to run a program or instructions to implement the processes of the DAI counting method or DAI counting control method embodiment, with the same technical effects achieved. To avoid repetition, details are not described herein again.

It should be understood that the chip in the embodiments of this application may also be referred to as a system-level chip, a system chip, a chip system, a system on chip, or the like. It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the description of the foregoing embodiments, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of this application.

The foregoing describes the embodiments of this application with reference to the accompanying drawings. However, this application is not limited to these specific embodiments. The specific embodiments are merely illustrative rather than restrictive. Inspired by this application, persons of ordinary skill in the art may develop many other manners without departing from the principle of this application and the protection scope of the claims, and all such manners fall within the protection scope of this application.

What is claimed is:

1. A downlink assignment index (DAI) counting method, applied to a terminal, comprising:
in a case that physical downlink control channel (PDCCH) repetition is configured, incrementing a DAI count at a reference PDCCH monitoring occasion;
wherein the method further comprises:
determining whether to increment a count of a DAI cycle counter; wherein the DAI cycle counter is used to count cycles of DAI values to determine how many cycles of DAI values have been completed;
wherein the determining whether to increment a count of a DAI cycle counter comprises:
in a case that a preset condition is satisfied, skipping incrementing the count of the DAI cycle counter, wherein
the preset condition comprises that:
N PDCCHs have been detected at PDCCH monitoring occasions for PDCCH repetition, the N PDCCHs carrying a same DAI value.

2. The method according to claim 1, wherein the reference PDCCH monitoring occasion comprises any one of the following:
a PDCCH monitoring occasion indicated by a network device; or
the first PDCCH monitoring occasion or the last PDCCH monitoring occasion in M PDCCH monitoring occasions corresponding to M PDCCHs in repetition, wherein M is an integer greater than 1.

3. The method according to claim 1, wherein a location of the reference PDCCH monitoring occasion is determined based on any one of the following:
the first PDCCH monitoring occasion in M PDCCH monitoring occasions corresponding to M PDCCHs in repetition, wherein M is an integer greater than 1; or
first indication information carried by a PDCCH, wherein the first indication information is used to indicate an ordinal position of the PDCCH in M PDCCHs.

4. The method according to claim 1, wherein the incrementing a DAI count at a reference PDCCH monitoring occasion comprises:
in a case that M PDCCHs in repetition have a same DAI value, incrementing the DAI count at the reference PDCCH monitoring occasion for a DAI value in a detected PDCCH.

5. The method according to claim 1, wherein the preset condition further comprises that:
the N PDCCHs have the same physical downlink shared channel (PDSCH) scheduling information.

6. The method according to claim 5, wherein the PDSCH scheduling information comprises at least one of the following: a new data indicator, a HARQ process number, a PDSCH resource, a transport block size, a redundancy version, a HARQ codebook priority, and a modulation and coding scheme.

7. The method according to claim 1, wherein after the incrementing a DAI count at a reference PDCCH monitoring occasion, the method further comprises:

determining a hybrid automatic repeat request acknowledgement HARQ-ACK codebook based on DAI values in L PDCCHs detected and a counted downlink control information DCI repetition number in the L PDCCHs, wherein L is a positive integer greater than 1.

8. The method according to claim 1, wherein the DAI comprises at least one of a counter DAI and a total DAI.

9. A non-transitory readable storage medium, wherein the readable storage medium stores a program or instructions, and the program or instructions, when executed by a processor, causes the processor to perform steps of the downlink assignment index (DAI) counting method according to claim 1.

10. The method according to claim 1, wherein the reference PDCCH monitoring occasion is one PDCCH monitoring occasion explicitly indicated by a network device.

11. A downlink assignment index (DAI) counting control method, applied to a network device, comprising:
in a case that physical downlink control channel (PDCCH) repetition is configured for a terminal, transmitting target information to the terminal, wherein the target information is used for the terminal to determine a reference PDCCH monitoring occasion so as to increment a DAI count at the reference PDCCH monitoring occasion;
wherein the target information is further used for the terminal to determine whether to increment a count of a DAI cycle counter; wherein the DAI cycle counter is used to count cycles of DAI values to determine how many cycles of DAI values have been completed;
wherein determining whether to increment a count of a DAI cycle counter comprises:
in a case that a preset condition is satisfied, skipping incrementing the count of the DAI cycle counter, wherein
the preset condition comprises that:
N PDCCHs have been detected at PDCCH monitoring occasions for PDCCH repetition, the N PDCCHs carrying a same DAI value.

12. The method according to claim 11, wherein the target information comprises any one of the following:
first indication information carried by a PDCCH, wherein the first indication information is used to indicate an ordinal position of the PDCCH in M PDCCHs in repetition, and M is an integer greater than 1; or
second indication information used to indicate the first PDCCH monitoring occasion in M PDCCH monitoring occasions corresponding to M PDCCHs in repetition, wherein M is an integer greater than 1.

13. The method according to claim 11, wherein the reference PDCCH monitoring occasion comprises any one of the following:
a PDCCH monitoring occasion indicated by the network device; or
the first PDCCH monitoring occasion or the last PDCCH monitoring occasion in M PDCCH monitoring occasions corresponding to M PDCCHs in repetition, wherein M is an integer greater than 1.

14. A network device, comprising: a memory, a processor, and a program or instructions stored in the memory and capable of running on the processor, wherein the program or instructions, when executed by the processor, causes the processor to perform steps of the downlink assignment index (DAI) counting control method according to claim 11.

15. The network device according to claim 14, wherein the target information comprises any one of the following:
first indication information carried by a PDCCH, wherein the first indication information is used to indicate an ordinal position of the PDCCH in M PDCCHs; or
second indication information used to indicate the first PDCCH monitoring occasion in M PDCCH monitoring occasions corresponding to M PDCCHs in repetition, wherein M is an integer greater than 1.

16. The network device according to claim 15, wherein the reference PDCCH monitoring occasion comprises any one of the following:
a PDCCH monitoring occasion indicated by the network device; or
the first PDCCH monitoring occasion or the last PDCCH monitoring occasion in M PDCCH monitoring occasions corresponding to M PDCCHs in repetition, wherein M is an integer greater than 1.

17. A terminal, comprising: a memory, a processor, and a program or instructions stored in the memory and capable of running on the processor, wherein the program or instructions, when executed by the processor, causes the processor to:
in a case that physical downlink control channel (PDCCH) repetition is configured, increment a downlink assignment index (DAI) count at a reference PDCCH monitoring occasion;
wherein the program or instructions, when executed by the processor, further causes the processor to:
determine whether to increment a count of a DAI cycle counter; wherein the DAI cycle counter is used to count cycles of DAI values to determine how many cycles of DAI values have been completed;
wherein the program or instructions, when executed by the processor, further causes the processor to:
in a case that a preset condition is satisfied, skip incrementing the count of the DAI cycle counter, wherein
the preset condition comprises that:
N PDCCHs have been detected at PDCCH monitoring occasions for PDCCH repetition, the N PDCCHs carrying a same DAI value.

18. The terminal according to claim 17, wherein the reference PDCCH monitoring occasion comprises any one of the following:
a PDCCH monitoring occasion indicated by a network device; or
the first PDCCH monitoring occasion or the last PDCCH monitoring occasion in M PDCCH monitoring occasions corresponding to M PDCCHs in repetition, wherein M is an integer greater than 1.

19. The terminal according to claim 17, wherein a location of the reference PDCCH monitoring occasion is determined based on any one of the following:
the first PDCCH monitoring occasion in M PDCCH monitoring occasions corresponding to M PDCCHs in repetition, wherein M is an integer greater than 1; or
first indication information carried by a PDCCH, wherein the first indication information is used to indicate an ordinal position of the PDCCH in M PDCCHs.

* * * * *